L. A. PENNINGTON.
MUD CHAIN COUPLING.
APPLICATION FILED OCT. 7, 1921.
1,414,041. Patented Apr. 25, 1922.
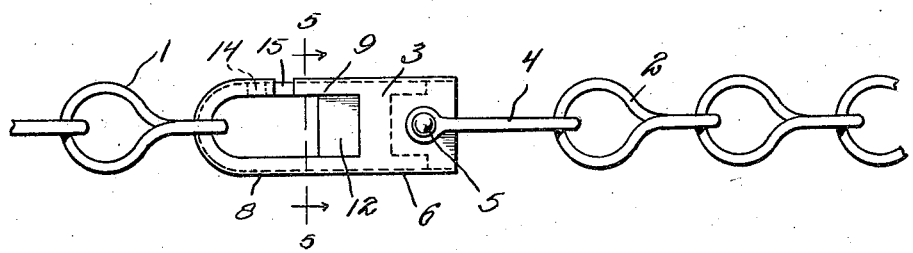
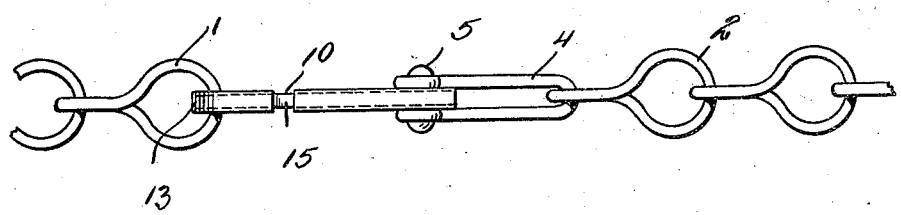
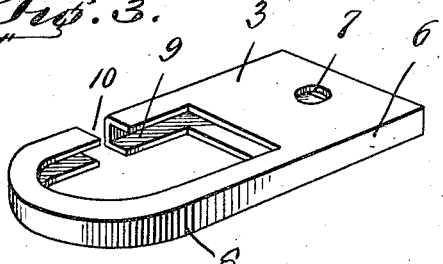
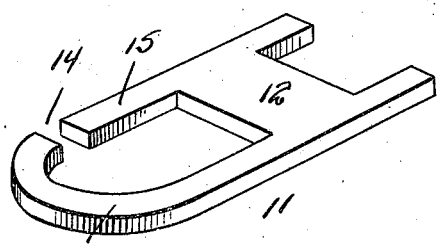
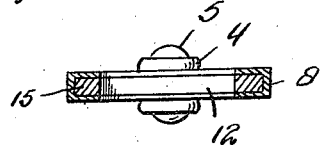
Witnesses:-
Hyman Berman
R. E. Davidson.
Inventor
Loyd A. Pennington,
By Clarence A. O'Brien
Attorney

Ȧ
UNITED STATES PATENT OFFICE.

LOYD A. PENNINGTON, OF EMPORIA, KANSAS.

MUD-CHAIN COUPLING.

1,414,041.

Specification of Letters Patent.    Patented Apr. 25, 1922.

Application filed October 7, 1921. Serial No. 506,076.

*To all whom it may concern:*

Be it known that I, LOYD A. PENNINGTON, a citizen of the United States, residing at Emporia, in the county of Lyon and State of Kansas, have invented new and useful Improvements in Mud-Chain Couplings, of which the following is a specification.

The object of my said invention is the provision of a strong and durable safety coupling through the medium of which the ends of a mud chain may be expeditiously and securely connected together to fasten the chain about the felly and tire of an automobile wheel, and this in such manner that while there is no liability of casual disconnection of the chain ends irrespective of whether the wheel is rotating forwardly or rearwardly, the ends may be readily disconnected when it is desired to remove the chain from the wheel.

To the attainment of the foregoing, the invention consists in the improvement as hereinafter described and definitely claimed.

In the accompanying drawings, forming part of this specification:—

Figure 1 is a plan view showing my novel coupling as connecting the ends of a mud chain.

Figure 2 is an edge view of the same.

Figures 3 and 4 are enlarged disconnected perspectives of the members comprised in my novel coupling.

Figure 5 is a transverse section, taken in the plane indicated by the line 5—5 of Figure 1.

Similar numerals of reference designate corresponding parts in all of the views of the drawings.

The end links of the mud chain illustrated are designated 1 and 2, respectively, and in the preferred embodiment of my invention, the end link 2 is permanently connected with one coupling member 3 through the medium of a clevis 4 and a pin 5, the latter being upset or otherwise appropriately headed at its ends or permanently secured in position in any other approved manner.

The coupling member 3 is formed of steel or other appropriate material and is characterized by a hollow body 6, open at its opposite ends and having alined apertures 7 in its side walls, and a loop 8 extending forwardly from the said body 7. The loop 8 is channeled, as designated by 9, the channels being in communication with the interior of the body 6, and one of the side bars of the loop is provided with a transverse opening 10 which extends throughout the thickness of the bar, Figure 3.

The other coupling member, designated by 11 and best shown in Figure 4, is stamped or otherwise produced of steel or other appropriate material, and is made up of a body 12, and a loop 13, with an opening 14 in one of its side bars 15.

In practice, the member 11 is introduced into the member 3, through the rear open end of the latter, precedent to the connection of the clevis 4 to the member 3 through the medium of the pin 5.

When it is desired to effect connection of the link 1 to the coupling and thereby bring about connection of the ends of the mud chain, it is simply necessary for the operator to move the member 11 rearwardly in the member 3 until the openings 14 and 10 are in registration, and then move the bight of the link 1 through the registered openings and into the coupling, when as will be readily understood the link 1 will be interlocked with the loops of both of the coupling members 3 and 11. Consequently the tension to which the mud chain is subjected in actual use will operate to hold the member 11 in its foremost position in the member 3, with the opening 14 of the member 11 forward of the opening 10 of member 3 so that there is no liability whatever of the link 1 being casually released from the coupling. When, however, it is desired to release the link 1 from the coupling, as when the mud chain is to be removed from a wheel, it is simply necessary for the operator with a screwdriver or similar instrument to press the member 11 rearwardly in member 3 until the opening 14 is registered with the opening 10, and then move the link 1 laterally out of the coupling.

Manifestly when desired mud chains equipped with my novel couplings may be connected together by short interposed chain sections at intervals in their lengths and used in pairs. This, however, is not of the essence of my invention, and I have therefore deemed it unnecessary to illustrate said arrangement.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A coupling for the ends of mud chains comprising a member having a hollow, rectangular body open at its rear and forward ends and apertured in opposite side walls, the latter for connection with one end of a mud chain, and also having a channeled forward loop with a transverse opening in one side bar of the loop and with the channels in its side bars in communication with the interior of the body, and a flat member slidable in the body and loop of the first-named member and having a body and a loop, the latter with an opening in one of its side bars adapted on rearward movement of the second member relative to the first member to register with the opening in the loop bar of said first member, in combination with means secured in the apertured body of the first-named member to secure the second-named member therein.

In testimony whereof, I affix my signature.

LOYD A. PENNINGTON.